(Model.)
2 Sheets—Sheet 1.
H. H. CARTER.
Combined Corn and Cotton Planter.
No. 233,979.    Patented Nov. 2, 1880.
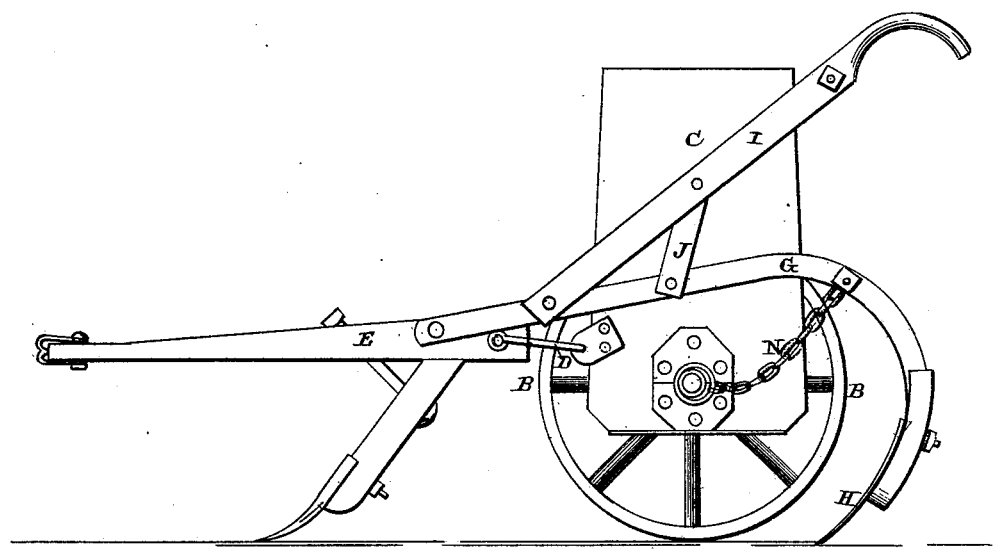
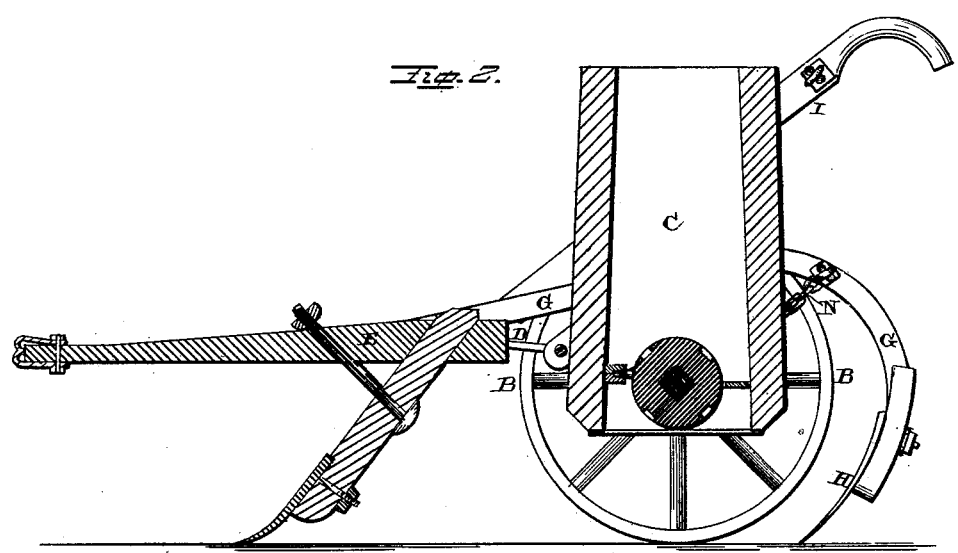

(Model.)  2 Sheets—Sheet 2.
H. H. CARTER.
Combined Corn and Cotton Planter.
No. 233,979. Patented Nov. 2, 1880.
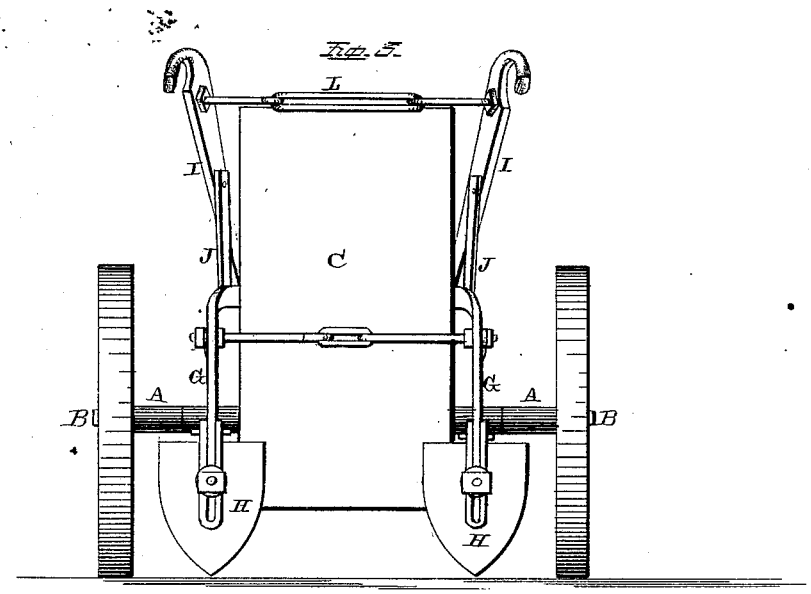
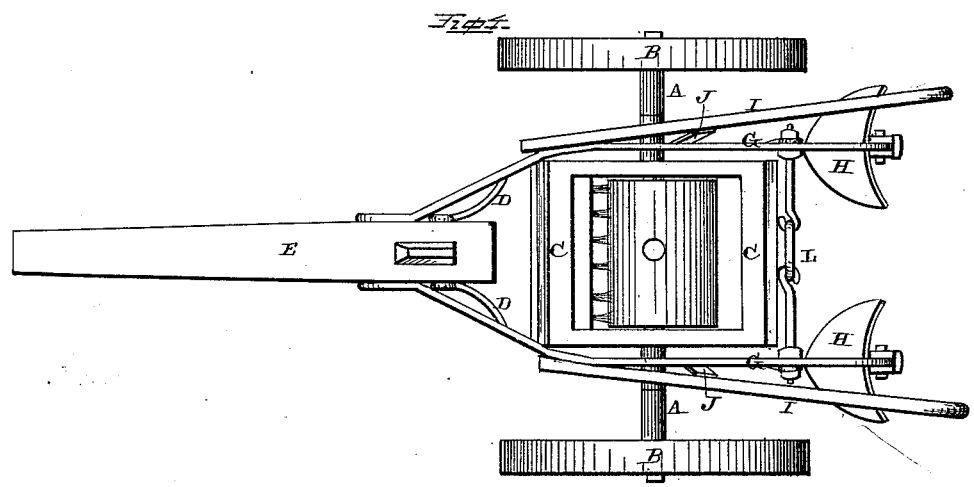
Witnesses:
W. W. Mortimer,
Will H. Kerr.
Inventor:
H. H. Carter,
per
F. A. Lehmann,
Atty.
N. PETERS, PHOTO-LITHOGRAPHER, WASHINGTON, D. C.

UNITED STATES PATENT OFFICE.

HIRAM H. CARTER, OF HEADSVILLE, TEXAS.

COMBINED CORN AND COTTON PLANTER.

SPECIFICATION forming part of Letters Patent No. 233,979, dated November 2, 1880.

Application filed August 14, 1880. (Model.)

*To all whom it may concern:*

Be it known that I, HIRAM H. CARTER, of Headsville, in the county of Robertson and State of Texas, have invented certain new and useful Improvements in Combined Corn and Cotton Planter; and I do hereby declare the following to be a full, clear, and exact description of the invention, such as will enable others skilled in the art to which it pertains to make and use it, reference being had to the accompanying drawings, which form part of this specification.

My invention relates to an improvement in walking corn and cotton planters; and it consists, first, in pivoting the plow-beam, provided with a shovel for making a furrow into which the seed is dropped, in between the front ends of the beams of the two covering-shovels, the seed-covering-shovel beams being secured to the handles of the machine, whereby the pivoted beam is controlled entirely by the handles; second, in pivoting the seed-box to the rear end of the beam, provided with shovel for forming a furrow for the seed to drop in, by means of the loose link or connection, so that the beam can be moved independently of the seed-box, as will be more fully described hereinafter.

Figure 1 is a side elevation of my invention with one of the wheels removed. Fig. 2 is a vertical section of the same. Fig. 3 is a rear view, and Fig. 4 is a plan view.

A represents the axle, B the driving-wheels, and C the seed-box.

Both of the driving-wheels are secured rigidly to the ends of the axle, so as to cause the axle to revolve as the machine is drawn forward, and this axle is made square at the center, where it passes through the seed-cylinder, for the purpose of causing the cylinder to revolve with it. Two kinds of cylinders are used, according to whether corn or cotton is being planted. The cylinder for planting corn is of the usual kind, having a number of recesses made in its side, and the one for planting cotton-seed has a number of projections extending out from its periphery, which, catching the seed, forces them through the opening in the bottom of the box. The bottom of this box consists in two slotted pieces, which can be adjusted nearer to or farther from each other, according as to whether corn or cotton is being planted.

The seed-box is made different from others now in use, so far as its shape is concerned. Instead of having the box largest at its top and smallest at its bottom, it is here made larger at its bottom and smallest at its top, not only so that the grain being planted will not have such a tendency to pack together, but so that a freer and better discharge is secured for the grain after it has passed the cylinder.

In removing one cylinder and replacing the other, it is necessary to take off one of the driving-wheels and draw the axle entirely out of the box, so that the one cylinder can be taken out and the second one inserted.

This seed-box is held in a vertical position upon the axle by means of a link, D, or other suitable fastening, which has its front ends pivoted to the rear end of the beam E. This beam E is provided with a shovel for opening the furrow for the grain to drop in, and has a clevis secured at its front end for the attachment of the draft-animals. The rear end of this beam E is also pivoted between the front ends of the two beams G, which beams G are provided at their rear ends with the covering-shovels H. These beams G are not secured to the box in any manner, though they extend along on each side of it, but have the handles I secured to them, not only near their front ends, but by means of the standards J. By means of these handles, which are connected loosely together by means of the rods and link L, the beam E and the two beams G can be controlled at will, and that without moving the seed-box to any very great extent. The two beams G are also connected loosely together by means of the two rods and the link, and these two beams are also connected to the axle by means of the chain N, so that when the handles are raised upward the whole machine is lifted up with it. By means of these chains, when the end of the furrow has been reached, the machine can be very readily raised up and turned around. By removing these two beams G from the planter, a first-class cultivator is formed by simply bolting their two front ends together.

Having thus described my invention, I claim—

1. In a corn and cotton planter, the combination of the beam E, pivoted between the front ends of the two beams G, which have the handles secured to them, the seed-box, the axle, dropping-cylinder, and driving-wheels, substantially as shown.

2. The combination of the beam E, pivoted between the front ends of the two beams G, which have the handles secured to them, the seed-box, and the connecting-link or fastening which connects the seed-box to the rear end of the beam, substantially as described.

3. The combination of the seed-box, axle, and driving-wheels with the beams G, having the handles secured to them, and the chains for connecting the axle with the beams, the beams G being entirely disconnected from the seed-box, substantially as shown and described.

4. In combination with a walking corn and cotton planter, the beam E, which is pivoted in front of the planter, and which is controlled entirely in its movements by a pair of beams which have the covering devices secured to their rear ends, and the handles, which are secured to the beams, substantially as set forth.

In testimony that I claim the foregoing I have hereunto set my hand this 27th day of July, 1880.

HIRAM H. CARTER.

Witnesses:
　WALTER S. BRYAN,
　W. M. WELKINS.